(12) United States Patent
Sullivan et al.

(10) Patent No.: US 11,892,083 B2
(45) Date of Patent: Feb. 6, 2024

(54) PISTON SEAL RING

(71) Applicant: Raytheon Technologies Corporation, Farmington, CT (US)

(72) Inventors: Liam P. Sullivan, Northborough, MA (US); Nicholas J. Lawliss, West Hartford, CT (US); Xuejun Liu, Avon, CT (US); John P. Virtue, Jr., Middletown, CT (US); Kalpendu J. Parekh, Brookline, MA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/714,376

(22) Filed: Apr. 6, 2022

(65) Prior Publication Data
US 2023/0323950 A1      Oct. 12, 2023

(51) Int. Cl.
*F01D 11/00*        (2006.01)
*F16J 9/20*         (2006.01)
*F02C 7/28*         (2006.01)

(52) U.S. Cl.
CPC ............... *F16J 9/20* (2013.01); *F01D 11/00* (2013.01); *F01D 11/003* (2013.01); *F01D 11/005* (2013.01); *F02C 7/28* (2013.01); *F05D 2220/32* (2013.01); *F05D 2240/58* (2013.01)

(58) Field of Classification Search
CPC ........ F02C 7/28; F05D 2240/58; F01D 11/00; F01D 11/003; F01D 11/005; F16J 15/16
See application file for complete search history.

(56) References Cited

U.S. PATENT DOCUMENTS

| | | | | |
|---|---|---|---|---|
| 3,393,917 A | * | 7/1968 | Kendall | F16J 15/185 277/584 |
| 3,743,303 A | * | 7/1973 | Pope | F16J 15/441 277/928 |
| 3,887,198 A | * | 6/1975 | McClure | F16J 15/441 277/579 |
| 5,169,159 A | * | 12/1992 | Pope | F16J 15/441 277/422 |
| 5,232,337 A | | 8/1993 | Glynn | |
| 5,292,138 A | | 3/1994 | Glynn et al. | |
| 7,648,277 B2 | | 1/2010 | Laurant et al. | |
| 7,775,764 B2 | | 8/2010 | Snowsill et al. | |

(Continued)

FOREIGN PATENT DOCUMENTS

| | | |
|---|---|---|
| DE | 102017130965 A1 | 6/2019 |
| EP | 4194666 A1 | 6/2023 |
| WO | 2021/195106 A1 | 9/2021 |

OTHER PUBLICATIONS

European Search Report dated Sep. 6, 2023 for European Patent Application No. 23164823.9.

*Primary Examiner* — David E Sosnowski
*Assistant Examiner* — Theodore C Ribadeneyra
(74) *Attorney, Agent, or Firm* — Bachman & LaPointe, P.C.

(57) ABSTRACT

A split ring seal has: a first circumferential end and a second circumferential end; an inner diameter surface and an outer diameter surface; a first axial end face and a second axial end face. A circumferentially distributed first plurality of open channels are along the first axial end face. A circumferentially distributed second plurality of open channels are along the second axial end face.

20 Claims, 9 Drawing Sheets

(56) References Cited

U.S. PATENT DOCUMENTS

| | | | |
|---|---|---|---|
| 8,905,407 B2* | 12/2014 | Ruggeri | F16J 15/442 |
| | | | 277/400 |
| 8,939,710 B2 | 1/2015 | Webb | |
| 9,638,326 B2* | 5/2017 | Haynes | F16J 15/26 |
| 9,695,940 B2 | 7/2017 | Haynes et al. | |
| 9,927,033 B2* | 3/2018 | Baheti | F16J 15/3488 |
| 10,145,255 B2 | 12/2018 | Miller et al. | |
| 10,190,429 B2 | 1/2019 | Garrison | |
| 10,619,742 B2 | 4/2020 | Miller et al. | |
| 11,525,515 B2* | 12/2022 | Zimmitti | F16J 15/26 |
| 11,542,819 B2* | 1/2023 | Heyerman | F01D 5/025 |
| 2012/0112415 A1* | 5/2012 | Benjamin | F16J 15/3272 |
| | | | 277/303 |
| 2016/0010483 A1* | 1/2016 | Miller | F04D 29/10 |
| | | | 277/580 |
| 2016/0116066 A1* | 4/2016 | Watanabe | F16J 15/443 |
| | | | 277/500 |
| 2016/0169389 A1* | 6/2016 | Haynes | F16J 15/26 |
| | | | 277/544 |
| 2018/0363484 A1 | 12/2018 | Miller et al. | |
| 2019/0154150 A1* | 5/2019 | Janakiraman | F15B 15/1461 |
| 2020/0191276 A1 | 6/2020 | Kopp | |
| 2020/0248817 A1* | 8/2020 | Bernacchi | F01D 11/003 |
| 2021/0032992 A1 | 2/2021 | Kray et al. | |

\* cited by examiner

PISTON SEAL RING

BACKGROUND

The disclosure relates to gas turbine engines. More particularly, the disclosure relates to piston seal rings (PSR).

Gas turbine engines (used in propulsion and power applications and broadly inclusive of turbojets, turboprops, turbofans, turbo shafts, industrial gas turbines, and the like) use PSR in several situations.

A PSR seals between an inner member and an outer member. The inner member and outer member may be static structure such as case components. Or, the inner member and the outer member may be rotating structure such as components of a spool or rotor. The inner member and the outer member may be subject to small excursions relative to each other. For example, torque loads may cause small rotational movements; thrust loads or differential thermal expansion may cause small axial movements. Vibration may also cause small rotational or axial movements. Such small or transient rotational movements, however, are distinguished from continuous relative rotational movement such as in face seal or shaft seal between two relatively rotating components (e.g., two different spools or a spool and a static structure).

The PSR is accommodated in an outer diameter groove in the inner member. Under pressure loading, the PSR seals against a sidewall of the groove and an inner diameter surface of the outer member. In one example of such a situation involving a rotor, the inner member is a shaft and the outer member is a rotor stack of the associated spool. In a more particular example, the outer member is a seal runner protruding axially from a protuberant bore of a disk of the rotor stack. Tension in the shaft holds the rotor stack in precompression. Small rotational, axial, and/or radial displacements of the shaft and seal runner may be caused by factors including transients and changes in operational conditions such as torque and thrust loads (which will vary between one steady state condition and another steady state condition). In such an example, the PSR is accommodated in an outer diameter (OD) groove in the shaft. In an operational condition where there is a pressure difference across the PSR, optimally, one axial end face of the PSR will bear against and seal against the adjacent sidewall face of the groove and the outer diameter (OD) surface of the PSR will bear and seal against the inner diameter (ID) surface of the seal runner. Specifically, if a first axial end face of the PSR is subject to higher pressure than the opposite second axial end face, the pressure difference will shift the PSR so that the second axial end face seats and seals against the associated/adjacent sidewall face of the groove. However, as discussed below, the optimal situation is not always the case.

PSRs are often small in cross section so as to be relatively compliant compared to the contacting structure (e.g., members forming the groove and runner). The ring is split for assembly purposes. The ring circumferential ends may form an overlapping joint (e.g., a shiplap joint). The small cross section and split provide the ring with little hoop strength and twist resistance. For example, with a nickel alloy shaft and nickel alloy runner, ring material may be nickel or cobalt alloy and may have generally similar material hardness (at least of a substrate if coated). Example coatings are an aluminum bronze (CuAl) layer directly atop the substrate outer diameter surface and a molybdenum sulfide ($MoS_2$) layer thereatop and extending onto the substrate axial end surfaces.

The manufacturing process as well as operational loads and wear can cause the ring's sealing surfaces to have flatness (of axial end faces) and/or circularity (of OD surface) errors that allow for local leakage through the seal. Non-axisymmetric leakage from the end gap (joint) or due to such PSR form errors leads to local thermal hotspots on the contacting structure (or coldspots such as if there as a low temperature pressurized fluid). These thermal hotspots may, in turn, lead to non-axisymmetric distortion of the contacting structure resulting in mass unbalance, localized stress concentrations, and reduced sealing performance. Other factors such as coning of the runner under load may also contribute to either a general axisymmetric unseating or a non-axisymmetric unseating, exacerbating the situation.

To combat flatness errors of the ring, some PSR designs have incorporated a secondary (spacer) ring that under centrifugal load provides a wedging action to seat a primary (seal) ring against the groove sidewall. See, U.S. Pat. No. 8,939,710, of Webb, Jan. 27, 2015, and entitled "Rotating turbomachine seal", the disclosure of which is incorporated by reference in its entirety herein as if set forth at length. That patent discloses slots in the face of the secondary ring to vent high pressure gas into the groove. The wedging may also correct some departures from circularity. This type of configuration requires additional parts, introduces additional wear surfaces, can be difficult to design with tolerances and varying PSR loads, and is only applicable to rotating applications.

SUMMARY

One aspect of the disclosure involves a split ring seal comprising: a first circumferential end and a second circumferential end; an inner diameter surface and an outer diameter surface; a first axial end face and a second axial end face; a circumferentially distributed first plurality of open channels along the first axial end face; and a circumferentially distributed second plurality of open channels along the second axial end face.

In a further embodiment of any of the foregoing embodiments, additionally and/or alternatively, the first plurality of open channels and the second plurality of open channels are in registry.

In a further embodiment of any of the foregoing embodiments, additionally and/or alternatively, the first and second pluralities of open channels have depth of 0.40 mm to 0.70 mm.

In a further embodiment of any of the foregoing embodiments, additionally and/or alternatively, a seal OD radii ($R_O$) is between 2.5 cm and 7.0 cm; and on each of the first axial end face and the second axial end face a total cross-sectional area of the channels is $k*R_O$ where k is a constant of value in a range of 0.012 $cm^2/cm$ to 0.020 $cm^2/cm$.

In a further embodiment of any of the foregoing embodiments, additionally and/or alternatively: the first circumferential end and the second circumferential end form a joint; of the first plurality of open channels, two channels closest to diametrically opposite the joint are the largest in cross-sectional area; and of the second plurality of open channels, two channels closest to diametrically opposite the joint are the largest in cross-sectional area.

In a further embodiment of any of the foregoing embodiments, additionally and/or alternatively: the first circumferential end and the second circumferential end form a joint; of the first plurality of open channels, the two channels closest to diametrically opposite the joint are separated by a larger gap from each other than from the next respective adjacent channels; and of the second plurality of open channels, the two channels closest to diametrically opposite the joint are separated by a larger gap from each other than from the next respective adjacent channels.

In a further embodiment of any of the foregoing embodiments, additionally and/or alternatively: of the first plurality of open channels, the two channels closest to diametrically opposite the joint are 20% to 100% larger in cross-sectional area than the next respective adjacent channels; and of the second plurality of open channels, two channels closest to diametrically opposite the joint are 30% to 100% larger in cross-sectional area than the next respective adjacent channels.

In a further embodiment of any of the foregoing embodiments, additionally and/or alternatively, each of the first and second pluralities of open channels comprise at least six open channels.

In a further embodiment of any of the foregoing embodiments, additionally and/or alternatively, the first circumferential end and the second circumferential end form a shiplap joint.

In a further embodiment of any of the foregoing embodiments, additionally and/or alternatively, the split ring seal comprises: a metallic substrate; and an outer diameter coating including at least an aluminum bronze layer.

In a further embodiment of any of the foregoing embodiments, additionally and/or alternatively: the split ring seal comprises an axial end face coating comprising molybdenum disulfide as a solid lubricant; and the outer diameter coating includes molybdenum disulfide as a solid lubricant atop the aluminum bronze layer.

In a further embodiment of any of the foregoing embodiments, additionally and/or alternatively, a machine includes the split ring seal and further comprises: an inner member; an outer member encircling the inner member; and a groove in one of the inner member and the outer member, the split ring seal accommodated in the groove and contacting a surface of the other of the inner member and the outer member.

In a further embodiment of any of the foregoing embodiments, additionally and/or alternatively, the machine is a gas turbine engine wherein: the groove is in the inner member; the inner member is a shaft of a spool; and the outer member is a seal runner protruding from a bore of a disk of a rotor stack of the spool.

In a further embodiment of any of the foregoing embodiments, additionally and/or alternatively, the inner member is made of a nickel-based alloy; the outer member is made of a nickel-based alloy; and the split ring seal comprises or consists of a nickel-based alloy or a cobalt-based alloy.

In a further embodiment of any of the foregoing embodiments, additionally and/or alternatively, a method for using the machine comprises: driving rotation of the inner member and the outer member and creating a pressure difference across the split ring seal; and the pressure difference causing gas flow through the first and second pluralities of open channels, the gas flow reducing a circumferential thermal asymmetry induced by a circumferentially asymmetrical seating of at least one of the first axial end face and the second axial end face.

A further aspect of the disclosure involves, an apparatus comprising: an inner member; an outer member encircling the inner member; and a split ring seal accommodated in a groove in one of the inner member and the outer member and contacting a surface of the other of the inner member and the outer member: and circumferentially distributed venting means for bypassing the seal.

In a further embodiment of any of the foregoing embodiments, additionally and/or alternatively, the split ring seal comprises: a first circumferential end and a second circumferential end; an inner diameter surface and an outer diameter surface; and a first axial end face and a second axial end face. The first circumferential end and the second circumferential end form a joint. The means comprises a plurality of open channels in the first axial end face. Of the plurality of open channels, two channels closest to diametrically opposite the joint are the largest in cross-sectional area.

In a further embodiment of any of the foregoing embodiments, additionally and/or alternatively, of the plurality of open channels, the two channels closest to diametrically opposite the joint are separated by a larger gap from each other than from the next respective adjacent channels.

In a further embodiment of any of the foregoing embodiments, additionally and/or alternatively, of the plurality of open channels, the two channels closest to diametrically opposite the joint are 20% to 100% larger in cross-sectional area than the next respective adjacent channels.

In a further embodiment of any of the foregoing embodiments, additionally and/or alternatively: the groove is in the inner member; and the sealing surface is an inner diameter surface of the outer member.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

To reduce the severity of the thermal asymmetry associated with a non-axisymmetric leakage (e.g., a locally mis-seated seal ring (PSR)), features providing a relatively axisymmetric base leakage may be added around the circumference of the PSR. The term "base" is used to limit confusion with "baseline" (used to identify a prior art PSR or other PSR lacking the features). The symmetric leakage is sufficient to at least partially offset any non-axisymmetric leakage and thus reduces the severity of the thermal asymmetry.

The example PSR features are radial channels machined on both axial end faces of the ring. These channels allow leakage through the channels on the high pressure, side around the PSR, and through the channels on the low pressure side. Based on the system requirements the channels' size, shape, and location can be adjusted to maintain an adequate seal.

For example, if a given condition introduces a non-axisymmetric leakage, superimposing a more axisymmetric leakage due to the channels, reduces the relative thermal asymmetry even if there is a further increase in heating at the hot spot. A similar consideration may occur if the high pressure area is relatively cool and leakage causes local cooling (cold spot).

Figure 1:
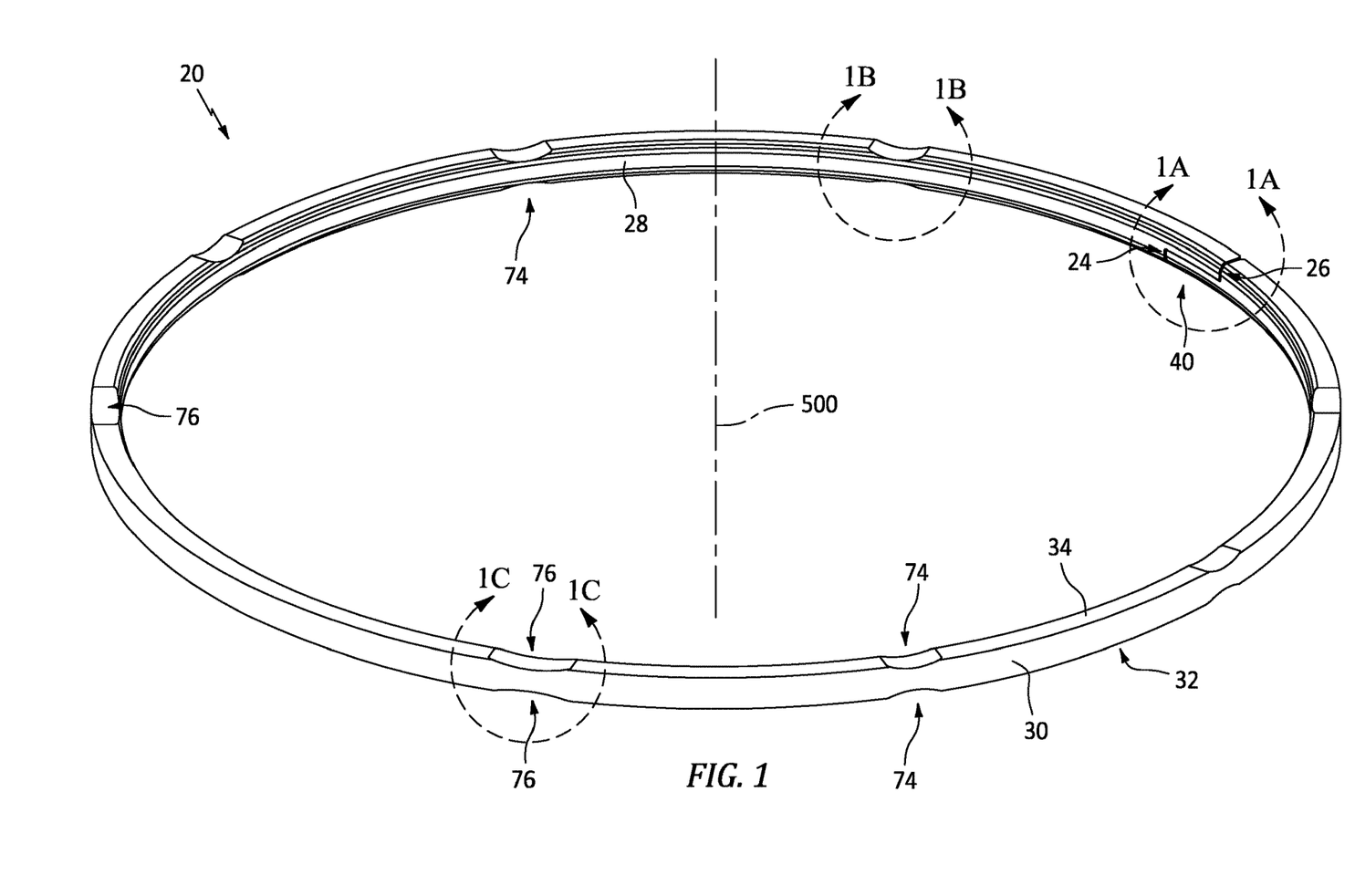
FIG. 1 is a view of a piston seal ring (PSR).
Figure 2:
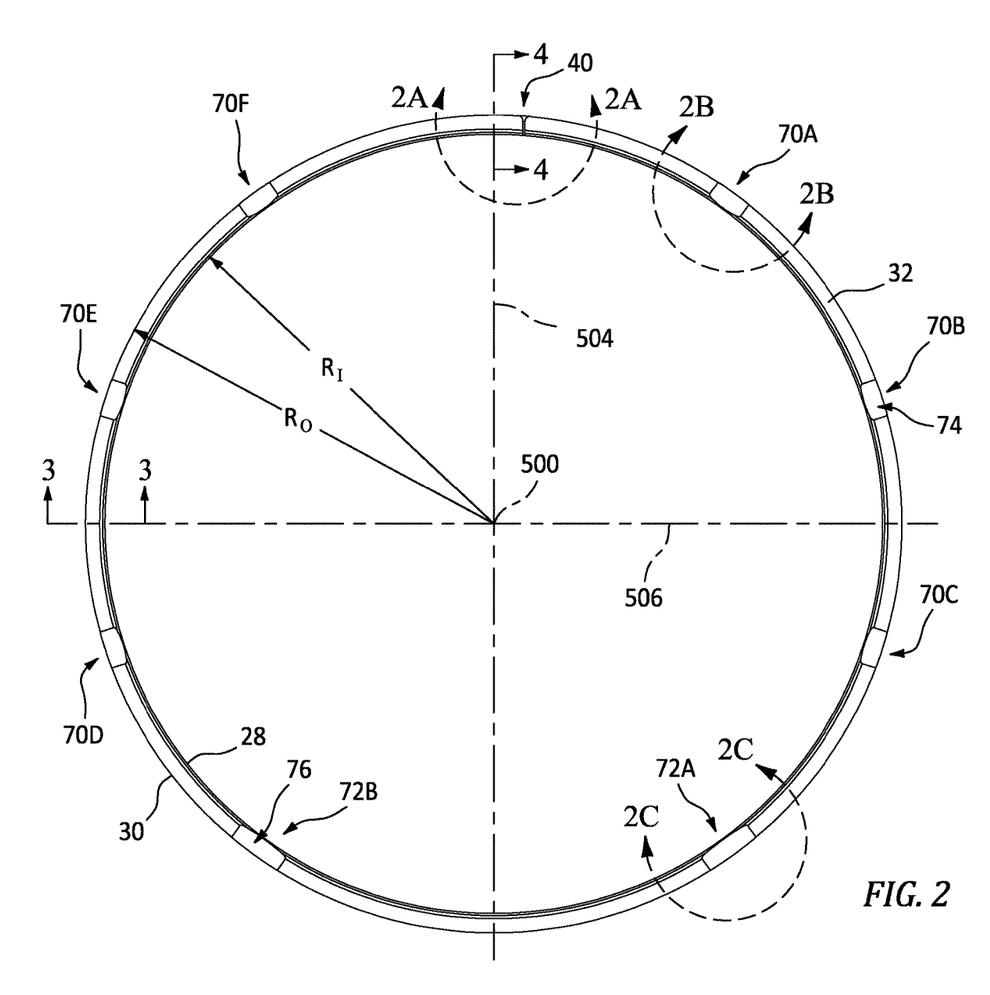
FIG. 2 is an axial end face/plan view of the PSR.
Figure 2A:
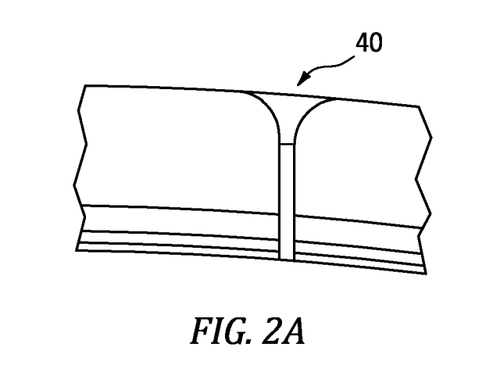
FIG. 2A is an enlarged view of the joint of the PSR.
Figure 3:
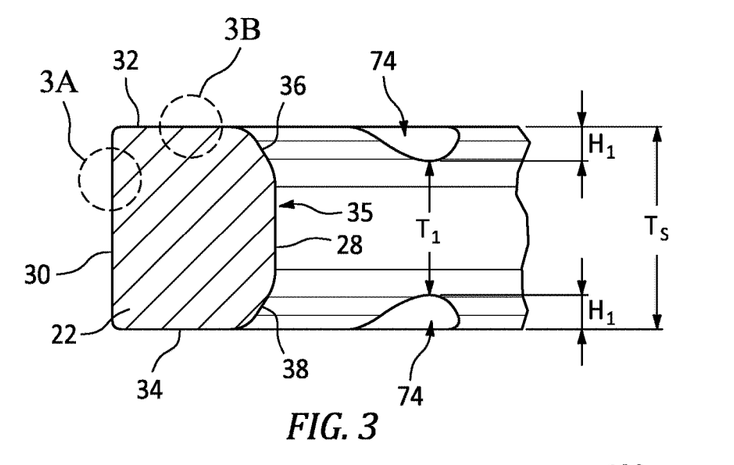
FIG. 3 is a cutaway cross-sectional view of the PSR taken along line 3-3 of FIG. 2.

FIG. 1 shows a piston seal ring (PSR) formed as a split ring seal 20 having a first circumferential end 24, a second circumferential end 26, an inner diameter (ID) surface 28, an outer diameter (OD) surface 30, a first axial end face 32, and a second axial end face 34. The PSR has a nominal central longitudinal axis (centerline) 500 shared with the members it seals when in a nominally centered condition. FIG. 2 shows a radius $R_I$ at the ID surface 28 and an outer radius $R_O$ at the OD surface 30. FIG. 3 shows the ID surface 28 as having a straight (circular cylindrical) central portion 35 and more frustoconical transitions 36 and 38 to the axial end faces 32 and 34, respectively. In the example, there are more radiused transitions at the extremes of the transitions 36 and 38 than centrally within those transitions. Viewed in section, junctions between the axial end faces and ID and OD surfaces are shown as radiused corners. However, other junctions are possible. The PSR also has a pair of orthogonal longitudinal centerplanes 504 and 506 arbitrarily defined so that 504 extends centrally through the joint 40.

Figure 1A:
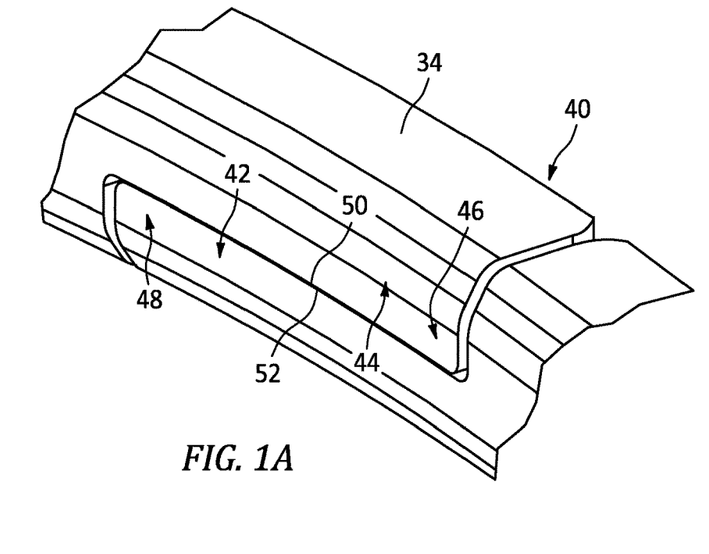
FIG. 1A is an enlarged view of a joint of the PSR.
Figure 1B:
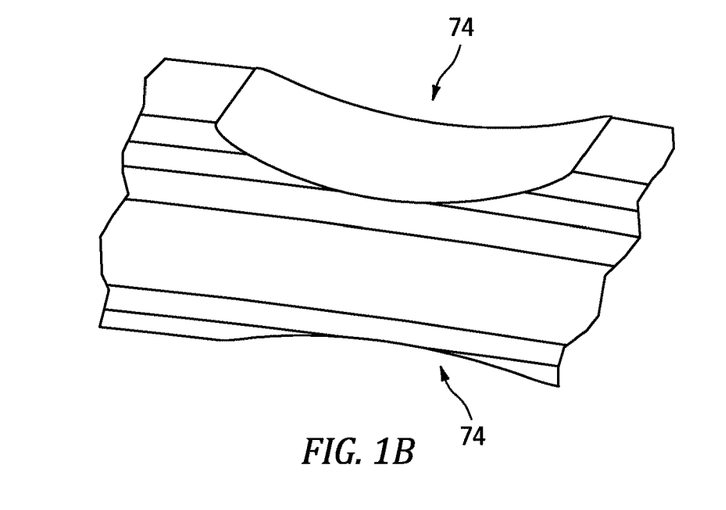
FIG. 1B is an enlarged view of a first venting recess pair of the PSR.
Figure 1C:
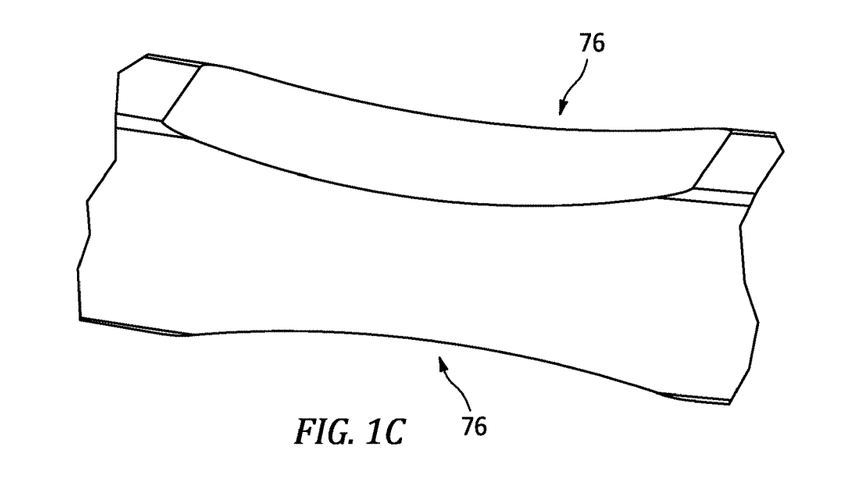
FIG. 1C is an enlarged view of a second recess pair of the PSR.

In the example, first circumferential end 24 and second circumferential end 26 form a joint or junction 40 (FIG. 1A). The example joint 40 is a shiplap joint with a projecting portion 42 of the first circumferential end received in a rebate 48 of the second circumferential end and a projecting portion 44 of the second circumferential end received in a rebate 46 in the first circumferential end. The example projecting portions have mating faces/surfaces 50, 52 which, in the example, closely face or contact along a transverse radial centerplane 502 (FIG. 4) of the PSR.

As discussed further below, the PSR may consist of a single alloy piece or may comprise a single alloy piece substrate with one or more coating layers along portions of its exterior surface (and thus forming associated portions of the exterior surface of the PSR). Coating thicknesses discussed below are small enough that overall dimensions and substrate dimensions may be within ranges given.

Figure 2B:
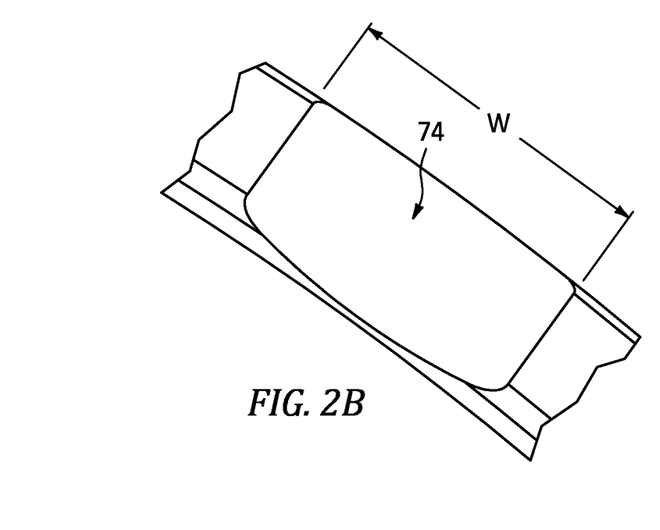
FIG. 2B is an enlarged view of a first recess of the PSR.
Figure 2C:
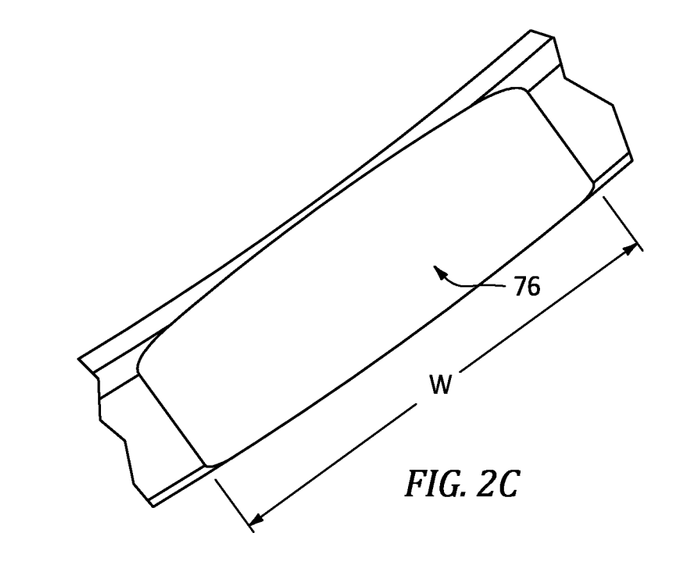
FIG. 2C is an enlarged view of a second recess of the PSR.

To provide venting (discussed further below), the PSR has a circumferentially distributed plurality of vents. In the FIG. 1 example, vents are channels, more particularly, open channels (or grooves or slots) 74, 76 (e.g., vs. closed channels being through-holes) along the first axial end face and similar open channels along the second axial end face both extending from the ID surface to the OD surface. Channel axial depth or height is labeled $H_1$ (FIG. 3) and channel width is labeled W (FIGS. 2B and 2C).

The illustrated channels extend essentially the full radial span of the sealing portions of axial end faces of the seal (exclusive of further relieved areas) that would potentially contact mating faces of the groove accommodating the seal. In the illustrated example the channels extend fully to the OD extreme of the cylindrical OD surface inboard of rounded transitions with the axial ends. At the ID, the channels do not extend all the way radially to the ID surface portion 35 due to the relief provided by the transitions 36 and 38. This is distinguished from radial channel segments in pressure balanced carbon seals (sealing between components subject to continuous relative rotation) that feed circumferential channels where the circumferential channel has a sidewall opposite the radial channel segment.

The PSR may consist of or comprise a metallic substrate 22 (FIG. 3) (e.g., with coating on one or more surface regions). The example PSR has a coated substrate with a coating 120 (FIG. 3A) on its OD surface (forming the PSR OD surface) and a coating 122 (FIG. 3B) on its axial end surfaces (forming the PSR axial end surfaces). The example OD coating 120 is a multi-layer coating with a base layer 124 and an anti-gallant layer 126 atop the base layer. The example axial end coatings 122 consist of just the anti-gallant layer 126.

Figure 3A:
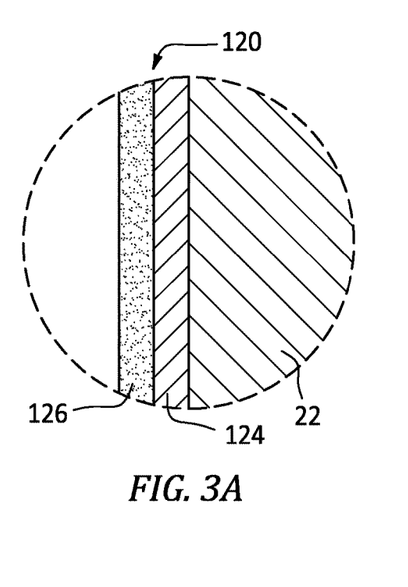
FIG. 3A is an enlarged view of an outer diameter (OD) region of the PSR of FIG. 3.
Figure 3B:
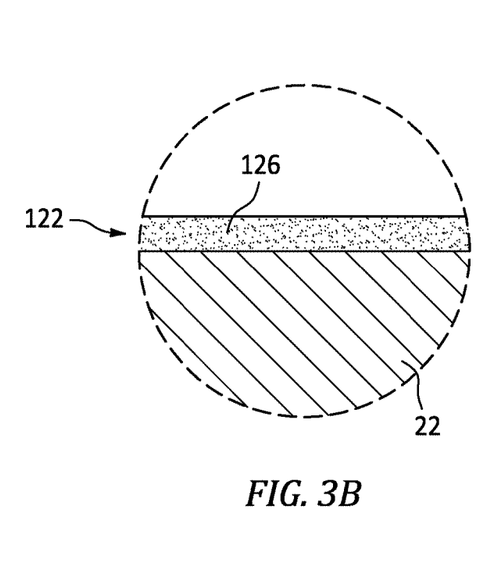
FIG. 3B is an enlarged view of an axial end region of the PSR of FIG. 3.

The base layer 124 may have a generally uniform thickness along the cylindrical region of the OD surface then tapering/feathering out over the rounded transitions to the axial end faces. This may be achieved such as via shadow masking or spray gun movement. Alternatively, a more abrupt termination of the base layer may occur such as via contact masking or fixturing. Similarly, the anti-gallant layer 126 may taper/feather out along a transition to the ID surface of the substrate such as along the frustoconical portions of transitions 36 and 38 or rounded transition portions between the frustoconical transition portions and the axial end surfaces.

The example base layer 124 is a CuAl coating applied to the substrate 22 OD surface by plasma spray (e.g., wire spray) preserved from a prior art baseline. An example CuAl aluminum bronze coating is CuAl 10 (e.g., 8.5-11.0 weight percent Al). Example CuAl coating thickness is 25 micrometer to 75 micrometer, more broadly 10 micrometers to 150 micrometers. Cu is the majority by weight component and typically essentially the balance with small amounts of alloyants (if any (e.g., up to 2.0 weight percent individually and up to 5.0 weight percent combined alloyants and impurities, more narrowly up to 2.0 weight percent combined). One known alloyant is Fe at about 1.0 weight percent.

The example anti-gallant is a dry film coating similarly preserved from a prior art baseline. Example dry film coating is a molybdenum sulfide ($MoS_2$). Example $MoS_2$ coating includes a silicate binder and is applied (over the outer diameter surface of the base layer 124 and over the substrate along the substrate axial end surfaces including transitions) as a water-based mixture by spraying (e.g., plasma spray) and baking. Example anti-gallant layer 126 thickness is 7.5 micrometers to 20.0 micrometers, more broadly 5.0 micrometers to 30. micrometers.

In the example PSR, the anti-gallant also covers substrate surface at the channels 74, 76 (and thus is applied only after channel formation). Nevertheless, alternative PSRs that involve post-coating channel formation may have exposed channel surfaces (exposed substrate material) recessed below coated axial end surface regions.

In one example of distributing the channels, the channels are evenly circumferentially spaced relative to the center of the joint with the joint representing an omitted channel from the even spacing. For example, if the joint is at twelve o'clock (in a rotating frame of reference for a rotor seal), there could be channels at every other hour on the clock for a total of eleven channels per face at an even spacing of 30°. A similar example would be nine channels at a spacing (on-center) of 36°. However, opening and closing of the PSR for mounting imposes the highest stress near the six o'clock position. Accordingly, the illustrated example omits a channel from the six o'clock position. With the omission of a channel from the six o'clock position, FIG. 1 shows an example where channels on opposite axial end faces 32, 34 are paired in exact registry with each other. The example PSR is symmetric between its two axial end faces allowing interchangeable installation in either orientation. The example pairing involves: pairs 70A, 70B, 70C, 70D, 70E, and 70F of channels 74 at the 36°, 72°, 108°, 252°, 288°, and 324° positions; and pairs 72A and 72B (discussed further below) of channels 76 at 144° and 216° positions (where twelve o'clock is) 0°. This leaves eight channels per side in two groups of four with even on-center spacing of 36° within each group. There is 72° on-center spacing between the groups at both diametric opposite locations centered at twelve o'clock and six o'clock. Thus, each pair of channels leaves a reduced thickness web 80 of seal material (FIG. 3) having a thickness labeled $T_1$. Example $T_1$ is 50% to 80% of the overall PSR thickness $T_S$, more particularly, 60% to 75% or 63% to 69%. An example number of channels per side is at least six (e.g., six to twelve or six to ten).

However, leakage through the joint 40 still presents an asymmetry of flow if there is no diametrically opposite channel. Accordingly, to compensate for that asymmetry, on each axial end face, the two channels 76 closest to diametrically opposite the joint are of greater cross-section than the other channels to more evenly distribute the net venting effect. In the illustrated example, these two channels 76 have the same channel depth or axial height $H_1$ as the channels 74 (FIG. 3) but a greater width or circumferential span W. The example channels 74 and 76 are of arcuate cross-section. For example, if machined with a circular profile bit, the channels 76 have a greater radius of curvature than the channels 74.

In the examples of channels whose cross-section are circular segments, the cross-sectional areas may be calculated via known formulas. In one example, the cross-sectional area (normal to a central radius from the centerline 500) of each channel 76 is about 50% larger than that of each channel 74. This may reflect an approximation that leakage through the joint 40 will be similar to leakage through a pair of channels 74 so that the combined cross-sectional area of the two pairs 72A, 72B of channels 76 equals the net cross-sectional venting provided by the joint 40 and the pairs 70A and 70F of channels 74. More broadly, example channel 76 cross-sectional area is 120% to 200% or 130% to 180% of the cross-sectional area of channel 74. Due to relative thinness of the coating, these numbers may apply to an uncoated substrate, a substrate coated both within the channels and beyond, and a substrate coated only beyond the channels. And they may be measured pre-coating or post-coating.

Figure 5:
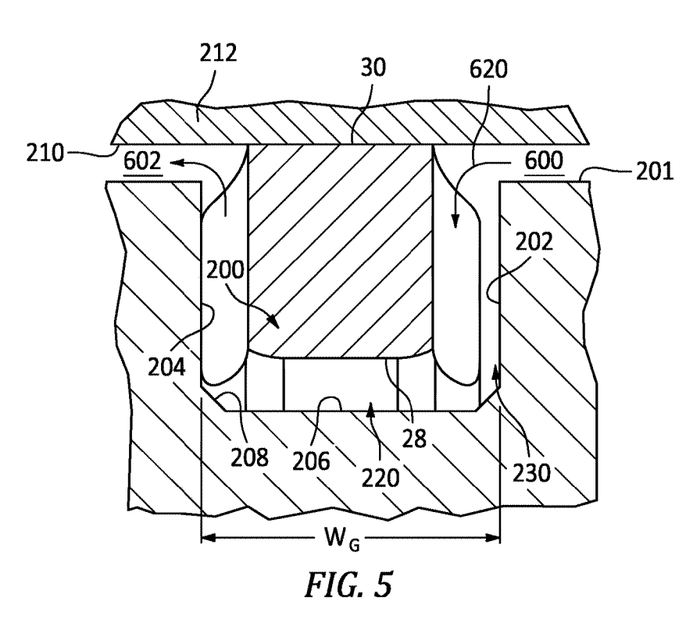
FIG. 5 is an enlarged view of the PSR in a fully seated circumferential location.
Figure 8:
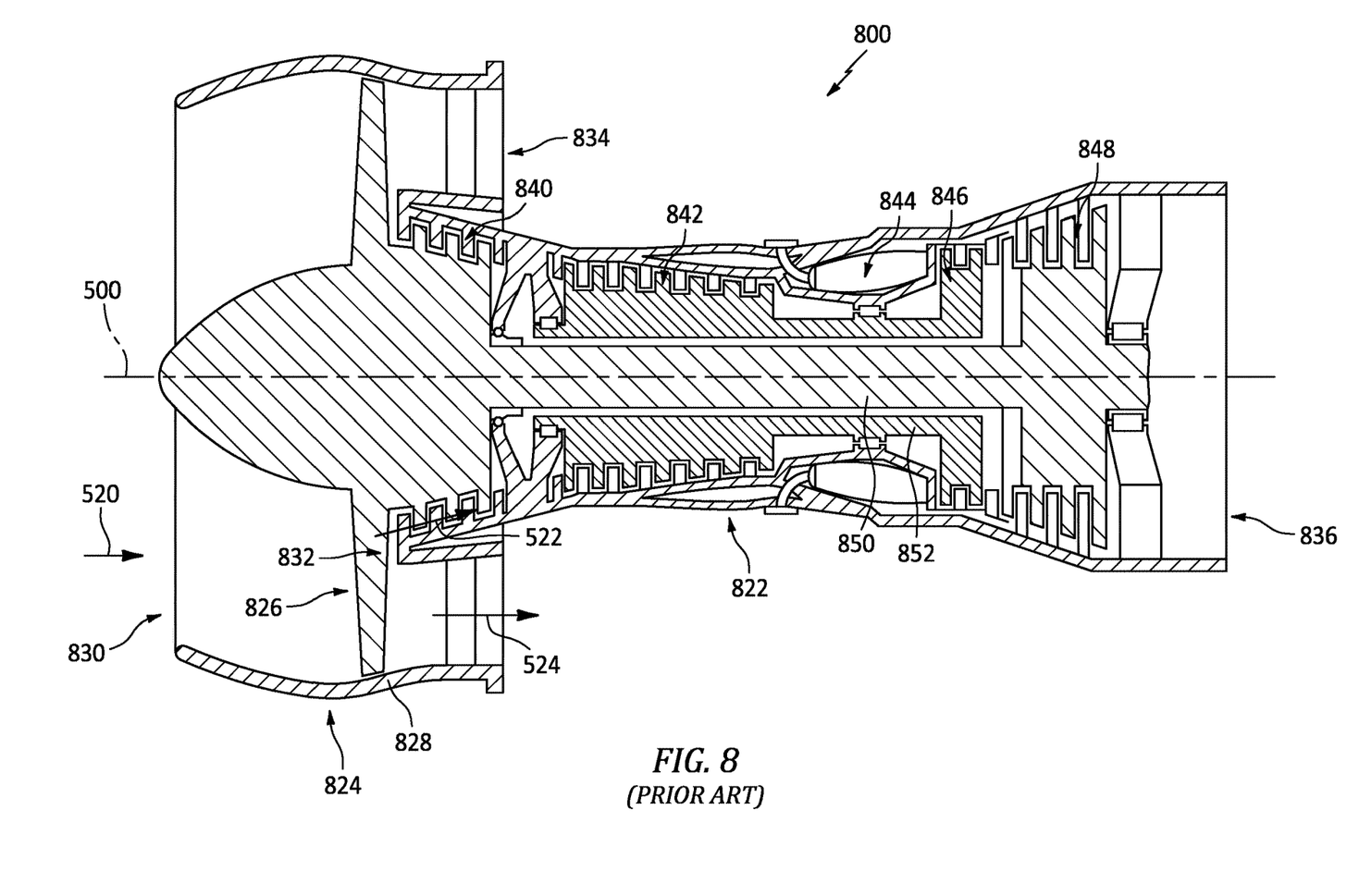
FIG. 8 is a schematized half sectional view of a gas turbine engine.
Figure 8A:
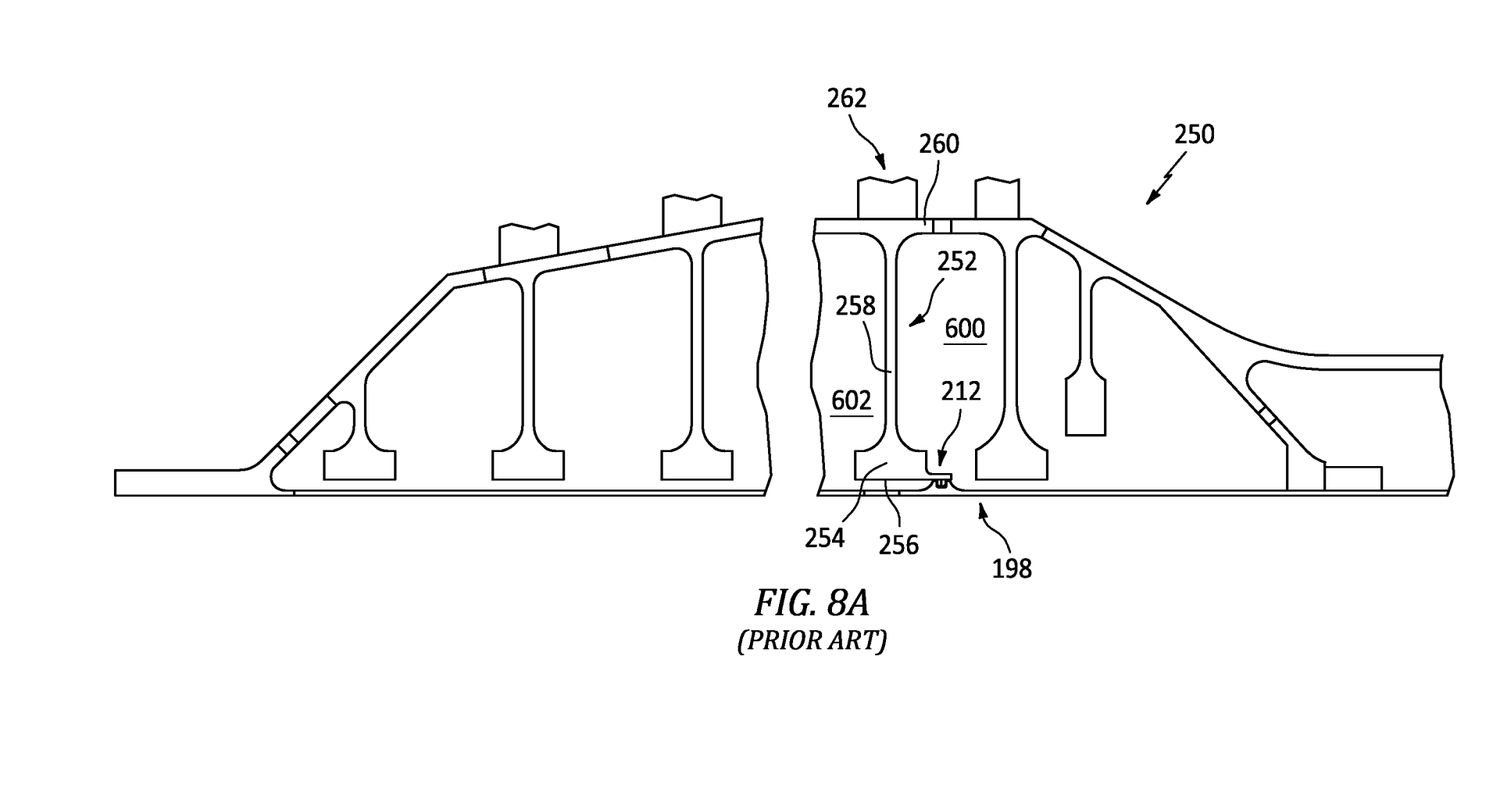
FIG. 8A is a partial longitudinal sectional view of a gas turbine engine rotor.

FIGS. 5 and 8A show the PSR 20 seated in an outer diameter groove 200 in an inner member (e.g., shaft or shaft section) 198 and sealing against an ID surface 210 of an outer member 212 (e.g., a seal runner). The groove 200 has a first sidewall or end wall 202, a second sidewall or end wall 204, and a base 206 joining the two. Example junctions between the sidewalls and the base are shown as chamfers or bevels 208. However, right angle junctions or other transitions are possible. The groove 200 extends radially inward from an outer diameter (OD) surface section or portion 201 of the inner member.

FIG. 8A shows the PSR in a gas turbine engine rotor 250 including the shaft section 198. Such a situation is discussed as background above. The example rotor is the high pressure compressor (HPC) portion of a high pressure spool of a two-spool engine. The rotor includes a stack of blade disks 252. Each blade disk includes a protuberant inner diameter (ID) bore 254 having an ID surface 256. A radial web 258 extends outward from the bore to a rim structure 260. A circumferential array of blades 262 (shown with airfoil tips cut away) may be mounted to the rim (e.g., via fir tree or dovetail mounting). Or, blade airfoils may be unitarily formed with the rim and the rest of the disk (e.g., an integrally bladed rotor (IBR)).

The example PSR seals between the rotor shaft section 198 and one of the disk bores 254. The example seal runner 212 is unitarily formed with the particular disk bore and protrudes axially from the disk bore near the ID surface thereof to a free distal end/rim of the seal runner. This is one non-limiting example of one baseline situation in which the channeled PSR may replace a baseline unchanneled PSR.

In the example, there is axial play (i.e., the axial length $W_G$ between the groove 202 and 204 sidewalls is greater than the axial length or thickness $T_S$ (FIG. 3) of the PSR between the axial end faces 32 and 34). This axial play allows the presence of an axial gap between the PSR axial end face(s) and the adjacent groove sidewall(s). It potentially allows cocking of the PSR cross-section to contact both sidewalls and, thus, have one radially diverging gap and one radially converging gap if the aligned clearance is small enough (groove width $W_G$ is only slightly greater than the PSR thickness $T_S$).

In the example, there also is radial play with an ID radial gap 220 between the ID surface 28 of the PSR and the base of the groove. In the example, this is a static gap and a dynamic gap discussed below.

Figure 4:
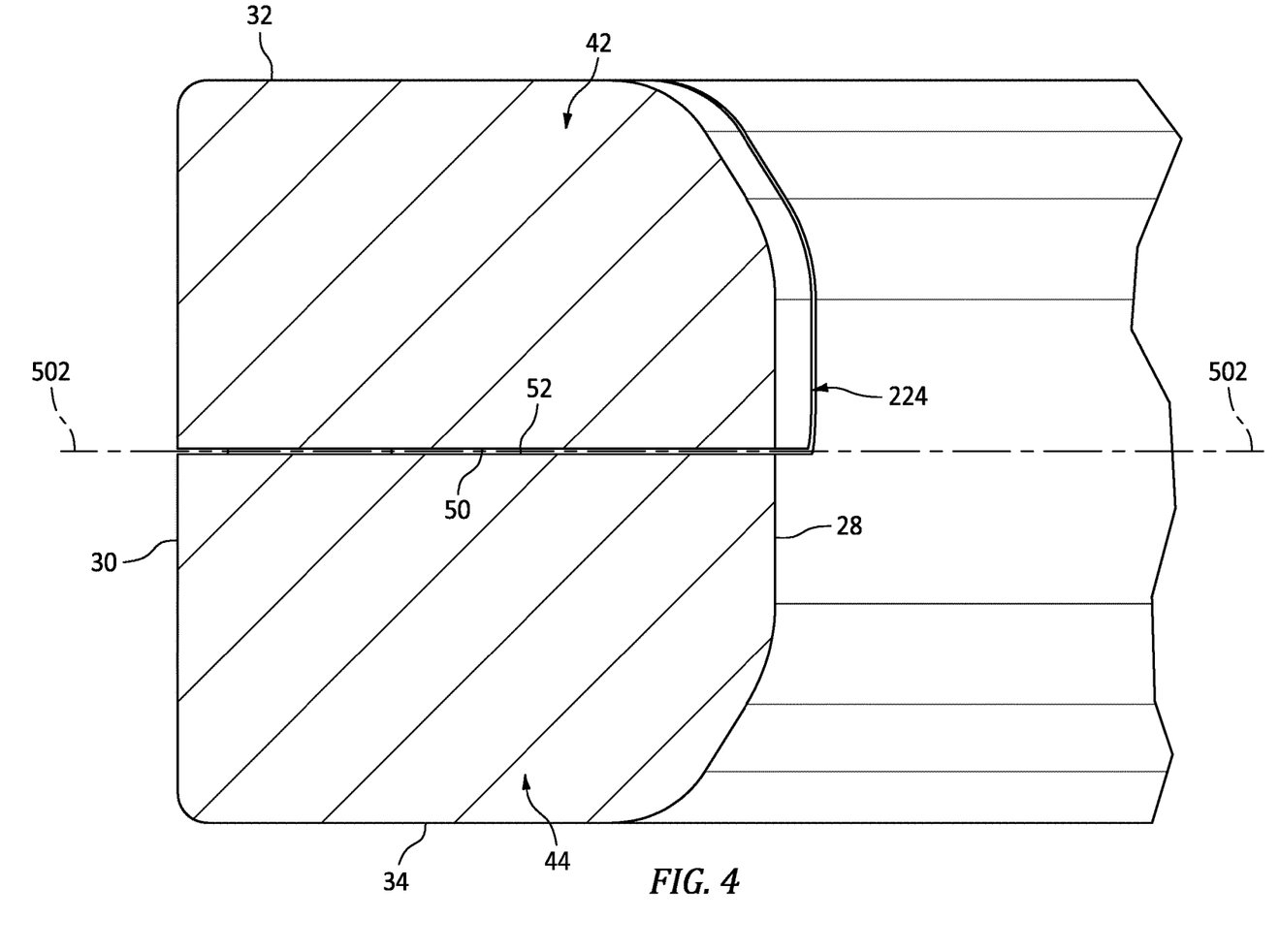
FIG. 4 is a cutaway cross-sectional view of the PSR taken along line 4-4 of FIG. 2.

The example PSR has a relaxed condition wherein the circumferential ends 24 and 26 are not completely nested/bottomed against each other (there is a slight circumferential gap 224 (FIG. 4). When assembled over the shaft and seated in the groove, there may be a small ID gap 220. However, the PSR OD surface 30 may be close to flush and even potentially sub-flush to the adjacent shaft OD surface 201. Thus, when the seal runner is assembled over the shaft and PSR, there is an at least local OD radial gap between the PSR OD surface 30 and the seal runner ID surface 210. However, when the shaft rotates, centrifugal action will radially expand the PSR, closing the OD gap and expanding the ID gap 220 (or creating the ID gap) and expanding the circumferential gap 224. This centrifugal action biases the PSR OD surface 30 into sealing engagement with the ID surface 210 of the seal runner.

Nevertheless, other variations include the PSR having a relaxed diameter of the OD surface 30 greater than the diameter of the seal runner ID surface 210 so as to have a static radial sealing bias not merely a dynamic radial sealing bias.

In use, various static and dynamic factors may cause uneven seating.

Figure 6:
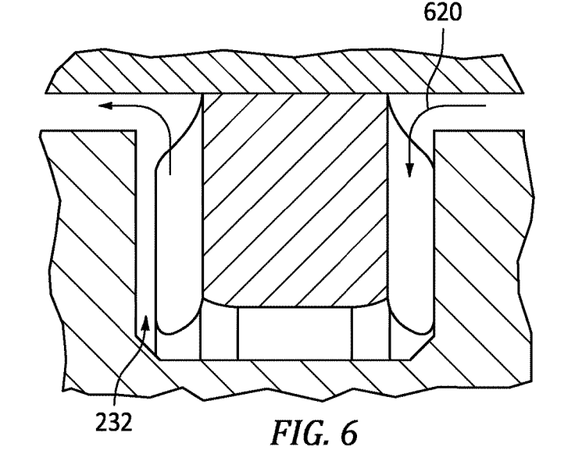
FIG. 6 is an enlarged view of the PSR in a mis-seated circumferential location.

FIGS. 5 and 8A show the sealing between a first region or volume 600 and a second region or volume 602. In an example dynamic operating condition, the first region is a high pressure region and the second region is a low pressure region so that the pressure difference biases the PSR so that the axial end face to the low pressure side of the PSR contacts the groove sidewall 204 to the low pressure side and there is an axial gap 230 between the high pressure side axial end face of the PSR and the high pressure side sidewall of the groove. However, due to the asymmetries noted above, this dislodgement from low pressure side engagement may be at a limited circumferential extent. Other factors may overcome the pressure bias and cause unseating at the low pressure side (creating an axial gap 232 (FIG. 6)) and even potential contact at the high pressure side. FIG. 6, by way of example, shows local contact at the high pressure side.

Figure 7:
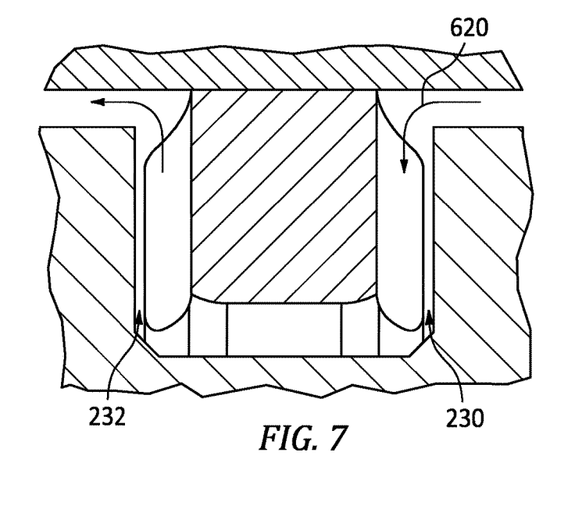
FIG. 7 is an enlarged view of the PSR in an intermediate mis-seated circumferential location.

For purposes of illustration, FIGS. 5, 6, and 7 show channels 74 or 76 at particular circumferential locations of seating or mis-seating. However, this is merely for purposes of illustration. Thus, a PSR might have a condition fully seated against the low pressure sidewall 204 like FIG. 5 but at a location away from the channels. Similarly, a FIG. 6 fully mis-seated condition may be away from the channels 74 and 76 and the more intermediate condition of FIG. 7 may be away from the channels 74 and 76.

Additionally, although not shown, there may be cocked conditions where the PSR axial end faces are not parallel to the adjacent groove sidewalls. Similarly, whereas the OD surface 30 of the PSR may be in full axial contact with the runner ID surface 210, other non-contacting or more locally contacting situations may be present.

From FIGS. 5-7, it is seen that in a baseline PSR without the channels 74 and 76 there would still be leakage flow 620 in the intermediate condition of FIG. 7 circumferential location. Thus, particularly with gaps 230, 232 to both sides (FIG. 7), in a baseline PSR there may be a leakage flow imposing a circumferential thermal asymmetry. Even if seated against the high pressure sidewall 202, increased local friction due to increased contact forces against the runner may locally increase temperature causing thermal asymmetry. In the FIG. 7 example, the PSR is unseated at both sides and there is a leakage flow with the prior art baseline. The presence of the channels 74 and 76 increases this leakage flow slightly relative to an otherwise similar baseline PSR lacking the channels. However, at another location (FIG. 5) where the PSR is seated, the essentially zero leakage flow of the baseline is replaced with a leakage flow through the channels. If the leakage flow is a high pressure and high temperature gas, even though the leakage flow at the FIG. 5 location is less than that at the FIG. 7 location, the net difference in heating between the different circumferential locations may be reduced relative to the baseline.

Similar considerations attend cooling depending upon the relative temperatures involved (e.g., when the high pressure fluid is relatively cool). Cooling may also be relevant where cocking of the PSR increases frictional heating. Thus, the venting flow may cool. Particularly, the venting flow may disproportionately cool the frictionally heated area.

In an example of dimensions, for a range of gas turbine engine compressor rotor sealing uses a generally linear relationship between seal radius or diameter on the one hand and effective venting area on the other hand has been found beneficial. At takeoff conditions example high pressure side pressure is about 1.6 MPa and low pressure side about 200 kPa for a difference of about 1.4 MPa. More broadly, example difference is 500 kPa to 2.0 MPa or 1.2 MPa to 1.6 MPa. This may typically involve seal OD radii $R_O$ between 2.5 cm and 7.0 cm, more particularly 3.5 cm and 5.0 cm. Example total channel area per side is $k*R_O$ where k is a constant of value of about 0.016 cm²/cm. A broader k range is 0.012 cm²/cm to 0.020 cm²/cm or 0.010 cm²/cm to 0.025 cm²/cm. So the total slot area (two sides) is thus double the per side area.

Example channel depth or height $H_1$ is 0.60 mm, more broadly 0.20 mm to 1.0 mm or 0.40 mm to 0.70 mm, but this will depend on PSR thickness. Example channel width W is 5.5 mm for the smaller channels and 8.0 mm for the larger channels. More broadly, a generic width may be an example 3.0 mm to 15.0 mm or 4.0 mm to 12.0 mm. The wider channels may be an example at least 20% wider or an example 20% wider to 150% wider (1.2 to 2.5 times the width). Due to relative thinness of the coating, these numbers may apply to an uncoated substrate, a substrate coated both within the channels and beyond, and a substrate coated only beyond the channels. And they may be measured pre-coating or post-coating.

The arcuate form of the channel surface limits flow losses and stress. A wide shallow arc limits stress (both by having greater web thickness $T_1$ and reducing stress concentration areas such as sharp internal corners). But a wide channel also removes more end/face contact area than a narrower deeper channel of the same cross-sectional (flow) area.

In terms of the number of channels per side, more channels allows tailoring for countering asymmetries. But more smaller channels may increase manufacturing costs relative to a smaller number of larger channels. Small channels, particularly shallow channels, may suffer from manufacturing tolerance which may be exacerbated by wear of the seal (e.g., a given wear will impose a greater area reduction with a shallow channel which is exacerbated if the channel is undersized due to machining tolerance). Use of a larger number of smaller cross-section channels may require the channels get closer to the six o'clock position, thereby bringing potential weak spots closer to the area most stressed by seal installation.

Component materials and manufacture techniques and assembly techniques may be otherwise conventional. Additionally, in one example, the channels are machined into an otherwise fully formed baseline PSR by machining (e.g., via end mill). Other machining examples include abrasive quills, abrasive wheels, and electrodischarge machining (EDM). In other examples, a baseline manufacture process is preserved with the channel machining added before the coating process.

In one example of a baseline process modified to add the channels, initial blanks may be cut from raw stock of nickel-based superalloy or cobalt-based superalloy. Example stock is barstock or tube form of alloy such as AMS 5894 cobalt alloy (particularly a cobalt-based, chromium-tungsten alloy) or Inconel 718 nickel-based superalloy.

The blanks are then rough cut (e.g., via lathe) to form a rough inner diameter (ID) hole and a rough outer diameter (OD) surface.

A further lathe may precision cut OD and ID surfaces, axial end faces, ID chamfers/bevels, and radii.

A side grinding process may further finish PSR substrate thickness/width, corner fillets, and surface finish.

An engine lathe may finish outer diameter (OD) corner radii.

The joint 40 gap and circumferential end features may be cut via a CNC mill including rounding of edges and crowning as in the prior art baseline.

The ring may be formed back down to a reduced OD associated with nesting the shiplapped end features (e.g., via progressive rolling).

Heat treating may relieve residual stress.

Then, departing from the baseline, the channels may be cut. As noted above, example cutting is via CNC mill and may involve one or more radial passes per channel. As noted above, there may be separate profiled tools for the different sizes of channel. Alternatively, one tool may cut both sizes of channel via additional passes for the larger channels 76.

Then, as with the example baseline there may be deburring (e.g., hand deburring) and inspection.

There may be partial masking of the PSR substrate prior to application of the base layer 124 (e.g., via fixturing, hard masking or in situ formed masking). Then, optionally after demasking, there may be optional precision machining (e.g., grinding/polishing) of the base layer for dimensions and/or finish.

Again, after masking, then anti-gallant layer 126 may be applied.

Alternatively to sealing a disk bore to a shaft, such venting means may be applied to static structures such as cases.

Alternatively, applications beyond gas turbine engines include pumps, turbochargers, and other turbomachines.

FIG. 8 shows an example gas turbine engine 800 as a two-spool turbofan engine. Although shown as a high bypass turbofan, a low bypass turbofan may have similar features. The engine 800 has an engine case 822 surrounding a centerline or central longitudinal axis 500. An example engine has a fan section 824 including a fan 826 within a fan case 828. The example engine includes an inlet 830 at an upstream end of the fan case receiving an inlet flow along an inlet flowpath 520. The fan 826 has one or more stages 832 of fan blades (typically one in a high bypass turbofan and more in a low bypass turbofan). Downstream of the fan blades, the flowpath 520 splits into an inboard portion 522 being a core flowpath and passing through a core of the engine and an outboard portion 524 being a bypass flowpath exiting an outlet 834 of the fan case.

The core flowpath 522 proceeds downstream to an engine outlet 836 through one or more compressor sections, a combustor, and one or more turbine sections. The example engine has two axial compressor sections and two axial turbine sections, although other configurations are equally applicable. From upstream to downstream there is a low pressure compressor section (LPC) 840, a high pressure compressor section (HPC) 842, a combustor section 844, a high pressure turbine section (HPT) 846, and a low pressure turbine section (LPT) 848. Each of the LPC, HPC, HPT, and LPT comprises one or more stages of blades which may be interspersed with one or more stages of stator vanes. In many low bypass turbofan configurations, the core and bypass flows rejoin to exit a nozzle (e.g., a variable nozzle).

In the example engine, the blade stages of the LPC and LPT are part of a low pressure spool mounted for rotation about the axis 500. The example low pressure spool includes a shaft (low pressure shaft) 850 which couples the blade stages of the LPT to those of the LPC and allows the LPT to drive rotation of the LPC. In the example engine, the shaft 850 also drives the fan. In the example implementation, the fan is driven via a transmission (not shown, e.g., a fan gear drive system such as an epicyclic transmission) to allow the fan to rotate at a lower speed than the low pressure shaft.

The example engine further includes a high pressure shaft 852 (of which the shaft section 198 forms a section) mounted for rotation about the axis 500 and coupling the blade stages of the HPT to those of the HPC to allow the HPT to drive rotation of the HPC. In the combustor 844, fuel is introduced to compressed air from the HPC and combusted to produce a high pressure gas which, in turn, is expanded in the turbine sections to extract energy and drive rotation of the respective turbine sections and their associated compressor sections (to provide the compressed air to the combustor) and fan.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A split ring seal comprising:
   a first circumferential end and a second circumferential end;
   an inner diameter surface and an outer diameter surface;
   a first axial end face and a second axial end face;
   a circumferentially distributed first plurality of open channels along the first axial end face; and
   a circumferentially distributed second plurality of open channels along the second axial end face,
   wherein:
   the first circumferential end and the second circumferential end form a joint;
   of the first plurality of open channels, two channels closest to diametrically opposite the joint are the largest in cross-sectional area; and
   of the second plurality of open channels, two channels closest to diametrically opposite the joint are the largest in cross-sectional area.

2. The split ring seal of claim 1 wherein:
   the first plurality of open channels and the second plurality of open channels are in registry.

3. The split ring seal of claim 1 wherein:
   the first plurality of open channels and the second plurality of open channels have depth of 0.40 mm to 0.70 mm.

4. The split ring seal of claim 1 wherein:
   a seal OD radii ($R_O$) is between 2.5 cm and 7.0 cm; and
   on each of the first axial end face and the second axial end face a total cross-sectional area of the channels is $k*R_O$ where k is a constant of value in a range of 0.012 cm$^2$/cm to 0.020 cm$^2$/cm.

5. The split ring seal of claim 1 comprising:
   a metallic substrate.

6. The split ring seal of claim 1 wherein:
   of the first plurality of open channels, the two channels closest to diametrically opposite the joint are separated by a larger gap from each other than from the next respective adjacent channels; and
   of the second plurality of open channels, the two channels closest to diametrically opposite the joint are separated by a larger gap from each other than from the next respective adjacent channels.

7. The split ring seal of claim 1 wherein:
   of the first plurality of open channels, the two channels closest to diametrically opposite the joint are 20% to 100% larger in cross-sectional area than the next respective adjacent channels; and
   of the second plurality of open channels, two channels closest to diametrically opposite the joint are 30% to 100% larger in cross-sectional area than the next respective adjacent channels.

8. The split ring seal of claim 1 wherein:
each of the first and second pluralities of open channels comprise at least six open channels.

9. The split ring seal of claim 1 wherein:
the first circumferential end and the second circumferential end form a shiplap joint.

10. The split ring seal of claim 1 comprising:
a metallic substrate; and
an outer diameter coating including at least an aluminum bronze layer.

11. The split ring seal of claim 10 wherein:
the split ring seal comprises an axial end face coating comprising molybdenum disulfide as a solid lubricant; and
the outer diameter coating includes molybdenum disulfide as a solid lubricant atop the aluminum bronze layer.

12. A machine including the split ring seal of claim 1 and further comprising:
an inner member;
an outer member encircling the inner member; and
a groove in one of the inner member and the outer member, the split ring seal accommodated in the groove and contacting a surface of the other of the inner member and the outer member.

13. The machine of claim 12 being a gas turbine engine wherein:
the groove is in the inner member;
the inner member is a shaft of a spool; and
the outer member is a seal runner protruding from a bore of a disk of a rotor stack of the spool.

14. The machine of claim 12 wherein:
the inner member is made of a nickel-based alloy;
the outer member is made of a nickel-based alloy; and
the split ring seal comprises or consists of a nickel-based alloy or a cobalt-based alloy.

15. A method for using the machine of claim 12, the method comprising:
driving rotation of the inner member and the outer member and creating a pressure difference across the split ring seal; and
the pressure difference causing gas flow through the distributed plurality of open channels, the gas flow reducing a circumferential thermal asymmetry induced by a circumferentially asymmetrical seating of at least one of the first axial end face and the second axial end face.

16. An apparatus comprising:
an inner member;
an outer member encircling the inner member; and
a split ring seal accommodated in a groove in one of the inner member and the outer member and contacting a surface of the other of the inner member and the outer member,
wherein:
the split ring seal comprises:
a first circumferential end and a second circumferential end;
an inner diameter surface and an outer diameter surface; and
a first axial end face and a second axial end face;
the first circumferential end and the second circumferential end form a joint;
the split ring seal comprises venting means for bypassing the seal so as to compensate for an asymmetry of flow due to leakage through the joint.

17. The apparatus of claim 16 wherein:
the means comprises a circumferentially distributed plurality of open channels in the first axial end face; and
of the plurality of open channels, two channels closest to diametrically opposite the joint are the largest in cross-sectional area.

18. The apparatus of claim 17 wherein:
of the plurality of open channels, the two channels closest to diametrically opposite the joint are separated by a larger gap from each other than from the next respective adjacent channels.

19. The apparatus of claim 17 wherein:
of the plurality of open channels, the two channels closest to diametrically opposite the joint are 20% to 100% larger in cross-sectional area than the next respective adjacent channels.

20. The apparatus of claim 16 wherein:
the groove is in the inner member; and
the sealing surface is an inner diameter surface of the outer member.

* * * * *